UNITED STATES PATENT OFFICE.

HERBERT COFFMAN, OF NAZARETH, PENNSYLVANIA.

JUICE-ASEPTICIZING PROCESS.

1,270,698.  Specification of Letters Patent.  Patented June 25, 1918.

No Drawing.  Application filed April 16, 1917. Serial No. 162,508.

*To all whom it may concern:*

Be it known that I, HERBERT COFFMAN, a citizen of the United States, residing at Nazareth, in the county of Northampton and State of Pennsylvania, have invented certain new and useful Improvements in Juice-Asepticizing Processes, of which the following is a specification.

This invention relates to certain new and useful improvements in juice asepticizing processes.

The primary object of the invention is the provision of a quick and ready manner of asepticizing juices and primarily orange juices, although the process is adaptable for preserving the juices of all kinds of fruits and vegetables, such as citrous fruits, lemons, grape-fruit and also grapes, peaches, apples, etc.

A further object of the invention is to produce a commercially practical product consisting of pure orange juice or other fruit or vegetable juice which will keep indefinitely, retaining in the finished product the natural flavors and conditions of acidity as well as the other original properties of the fruit from which the juice is reduced.

A still further object of the invention is the provision of a speedy process for preserving all manners of fruit and vegetable juices in such a manner as to retain to a great extent, the natural taste and properties of the fresh articles, thereby conserving a large amount of grown products which would otherwise be wasted but by the present provision are utilized in a commercially practicable manner for the health and benefit of the public.

The present process being especially adaptable for preserving pure orange juice, which is one of the most valuable food juices, the present process will be herein described in connection therewith. The juice is first extracted from fruit in any desired manner, and then filtered or strained for extracting a portion of the pulp, retaining a sufficient degree of pulp therein to render the product of the desired purity, it being understood that a small percentage of pulp is essential for the retention of the characteristic color of the fruit.

The great rapidity in the operation of the process is highly essential, the diminution of the filtrate to air exposure increasing its efficiency and the value of the product. The length of time elapsing between the extraction of the juice and its inclosure within suitable receptacles such as bottles, should not exceed thirty minutes. In some instances, it may also be found desirable to extract the juices without their contamination by the oil from the skin of the fruit.

After the filtrate is placed in containers, the next step in the process is the removal of all air therefrom by passing a stream of carbon-dioxid ($CO_2$) gas through the juice and sealing the containers with such gas substituted for the air content, any space which may be found above the juice adjacent the container being gas-filled. It will be understood that this introduction of the gas is in no manner detrimental to the juice, the containers being sealed in any well-known manner, such as by the employment of corks or crown seals employed with bottled goods. While the carbon-dioxid gas is thus forced through the juice, retaining a quantity of the gas therein under atmospheric pressure, it is also contemplated when desired, to charge the juice with the said gas, retaining the same under desirable pressure, thereby producing a carbonated fruit juice suitable for drinking and other purposes.

Pasteurization is a further step in the present process, the containers or bottles being placed immediately after sealing into water at a temperature approximating 145° F. The temperatures of the containers should never exceed 150° F. but must be approximately that herein set forth to accomplish the desired results. The said containers are removed from the hot water after a period of from twenty to thirty minutes, depending upon the size of the container, the time required to uniformly heat the mass to the temperature of the water. It will be noted that if desired, the filled containers may be placed in cold water and the temperature thereof gradually raised until the required temperature of approximately 145° F. has been reached.

After this heating of the containers, the same are removed from the water for cooling and after a suitable period approximating forty-eight hours, the pasteurizing process is repeated, the second heating of the juice being of less duration than in the first operation, only from fifteen to twenty minutes being required for the second pasteurizing step, which is at the former temperature of approximately 145° F.

It will be understood that after the second heating of the juice the same constitutes the finished product being sealed in the original containers and is ready to be placed on the market. With the employment of pulp retained in the juice, brown bottles are preferable for marketing the product as this gives the presence of the product as this gives the presence of the pulp less prominence while light is better prevented from passing therethrough for any possible effect upon the juice. While two heatings of the juice for pasteurizing the same are deemed sufficient, a greater number of reheating steps at approximately the same temperature may be practiced with a corresponding reduction in the length of time of each succeeding heating operation.

For preserving the aseptic condition of the juices, the containers may have the outlet closures thereof suitably paraffined and the containers arranged inverted at times intermediate the pasteurizing steps for the purpose of testing the sealing thereof if desired as a precautionary measure.

While the steps of the process as set forth are deemed preferable, it will be understood that slight variations therein may be requisite in treating juices of different kinds of fruits and vegetables while the specific process described is applicable to citrous fruit juices and any such variations will not depart from the scope of my invention as herein claimed. In the practice of this process the employment of carbon-dioxid gas may be omitted and the juice pasteurized for assisting its preservation. The efficiency of the present process is largely dependent upon the rapidity with which the process is carried out and the preventing of air from coming in contact with the juice, as such, to the greatest possible extent. The finished product when the gas is employed will retain a slight trace thereof without impairing the taste, flavor, or quality of the juice.

What I claim as new is:—

1. A juice asepticizing process consisting in extracting the juice from fruit, substantially immediately passing carbon dioxid gas through the juice and sealing the same in a container, and then heating the same as high as 145° F., but not above 150° F.

2. A juice asepticizing process consisting in extracting the juice from fruit, substantially immediately replacing the air in the juice with carbon dioxid gas and sealing the juice in a container, and then heating the same as high as 145° F. but not above 150° F.

3. A juice asepticizing process consisting in extracting the juice from fruit, substantially immediately passing carbon dioxid gas through the juice and sealing the same in a container, then heating the juice as high as 145° F., but not above 150° F., retaining this temperature for approximately twenty-five minutes and then cooling and reheating for a relatively shorter time.

4. A juice asepticizing process consisting in extracting the juice from fruit, substantially immediately replacing the air in the juice with carbon dioxid gas and sealing the same in a container, then heating the juice as high as 145° F. but not above 150° F., retaining this temperature for approximately twenty-five minutes, and then cooling and reheating to a like temperature for a relatively shorter time.

5. A juice preserving process consisting in extracting juice from fruit, bottling the juice and passing carbon dioxid gas through the juice to replace the air within the bottles within thirty minutes after the extraction of the juice from the fruit, immediately sealing the bottles, and then placing the bottles in water at about 145° F. for twenty-five minutes, then removing and cooling the bottles, and after forty-eight hours repeating the heating step at the same temperature for about fifteen minutes.

In testimony whereof I affix my signature.

HERBERT COFFMAN.